(12) United States Patent
Strobel

(10) Patent No.: US 6,517,298 B1
(45) Date of Patent: Feb. 11, 2003

(54) METHOD FOR SELECTIVELY RELIEVING SHARP EDGES IN TOOLS USED IN DIE CUTTING SHEET-TYPE WORK MATERIAL

(75) Inventor: Wolfgang M. Strobel, Tolland, CT (US)

(73) Assignee: Gerber Scientific Products, Inc., South Windsor, CT (US)

(*) Notice: Subject to any disclaimer, the term of this patent is extended or adjusted under 35 U.S.C. 154(b) by 7 days.

(21) Appl. No.: 09/317,538

(22) Filed: May 24, 1999

(51) Int. Cl.[7] .............................. B23C 1/06; B23C 3/12
(52) U.S. Cl. ............................ 409/132; 409/138; 76/4; 144/371; 83/174; 83/690
(58) Field of Search ................................ 409/131, 132, 409/138; 76/4, 82; 83/174, 690; 144/371, 136.95

(56) References Cited

U.S. PATENT DOCUMENTS

| | | | | |
|---|---|---|---|---|
| 3,249,272 A | * | 5/1966 | Scarpa | 225/1 |
| 4,836,722 A | * | 6/1989 | Kurita et al. | 409/132 |
| 4,921,154 A | * | 5/1990 | Abe et al. | 83/690 |
| 4,976,573 A | * | 12/1990 | Seki et al. | 409/138 |
| 4,993,896 A | * | 2/1991 | Dombrowski et al. | 409/138 |
| 5,035,554 A | * | 7/1991 | Nickols | 409/131 |
| 5,337,639 A | * | 8/1994 | Morrison | 83/690 |
| 5,458,717 A | | 10/1995 | Kurita | |
| 5,547,003 A | * | 8/1996 | Susnjara et al. | 144/371 |
| 5,575,318 A | * | 11/1996 | Susnjara | 144/2.1 |

FOREIGN PATENT DOCUMENTS

GB 1366757 9/1974

OTHER PUBLICATIONS

Great Britain Search Report, dated Oct. 19, 2000.

* cited by examiner

Primary Examiner—A. L. Wellington
Assistant Examiner—Erica Ergenbright
(74) Attorney, Agent, or Firm—McCormick, Paulding & Huber LLP

(57) ABSTRACT

A method for selectively relieving sharp edges in tools used in die cutting web or sheet-type work material which includes providing a machining apparatus for supporting the tool thereon, where the machining apparatus includes a rotary cutter mounted thereon and moveable relative to the tool. The method also includes providing a controller having machine readable shape data corresponding to at least one of the tools stored therein, and operating the controller to determine, responsive to the stored shape data, locations of edge segments defined by the tool against which the work material will impinge as the work material is advanced onto the tool in a first direction. In addition, the method includes causing the controller to generate a machining path, which when followed by the cutter will relieve the edge segments, and operating the machining apparatus to cause the cutter to follow the machining path in response to command signals generated by the controller, thereby relieving the edge segments and preventing the work material from catching on the tool as it is advanced thereon.

6 Claims, 1 Drawing Sheet

METHOD FOR SELECTIVELY RELIEVING SHARP EDGES IN TOOLS USED IN DIE CUTTING SHEET-TYPE WORK MATERIAL

FIELD OF THE INVENTION

The present invention generally relates to the manufacture of tools used in processes for die cutting sheet-type work material, and is more specifically directed to a method of fabricating said tools such that said die cut work material can be advanced thereon without becoming caught.

BACKGROUND OF THE INVENTION

In general, product packages, boxes, and the like are fabricated from die cut blanks made from sheet-type work material. Usually the blanks take the form of the product package or box in its unfolded or flat condition. To create a finished blank, a sheet of work material is advanced to several different processing stations, each performing a different work operation on the material. For example, the work material is initially advanced to a cutting station where a die-board having a series of rules projecting therefrom, is brought into engagement with the sheet of work material, usually cardboard.

In general, the rules are arranged in a pattern conforming to the shape of the blank to be cut, as well as to any internal areal sections to be cut from the blank, as well as any scrap material to be removed. In addition to the rules that cut through the work material, some are positioned such that when they engage the work material, they form indentations therein corresponding to crease lines in the blank.

During the die cutting operation, a series of small sections of work material, referred to by those skilled in the die cutting art as "nicks". bridge the gaps between the cut blank, and the remainder of the sheet of work material. The nicks prevent the blank from separating from the sheet of work material, which may have several blanks cut thereon, thereby allowing the sheet to be advanced to the next work station. Nicks also prevent any areal sections of work material corresponding to cut-outs in the blank from separating therefrom.

Subsequent to the die-cutting operation, the sheet of work material is usually advanced to a tool referred to by those in the art as a stripping board, where the areal sections corresponding to the cut-outs in the blank and any scrap material are removed. As used herein, the term "tool" should be broadly construed to include stripping boards, blanking tools, and their components. The stripping board typically consists of a female stripping board and a mating male stripping tool. The female stripping board has cut out sections therein that match the cut outs in the female stripping board. The male stripping tool includes protrusions projecting outwardly therefrom, of a shape complimentary to the cut outs in the female stripping board.

During operation, the sheet of work material having the blank retained thereon by the nicks, is advanced onto the female stripping board. The male stripping tool is then brought into engagement with the work material, thereby breaking the nicks and pushing the cut outs from the work material, through the corresponding cut outs in the female stripping board.

In some cases, subsequent to the above described stripping operation, the work material is advanced onto a blanking tool. Similar to the stripping board, the blanking tool includes a female tool having a cut out therein conforming to the shape of the outer periphery of the blank. The blanking tool also includes male tool having a portion projecting outwardly therefrom of a shape complimentary to the cut out in the female tool.

During a blanking operation, the male tool engages the sheet of work material, breaking the nicks retaining the blank thereon, thereby separating the blank from the sheet of work material. In both the stripping and blanking operations, it is desirable that the edges defined by the peripheries of the cut outs in the female stripping tool, and the female blanking tool be as sharp as possible in order to insure that the nicks are cleanly broken and that the edges of the blank and the cut outs therein are not torn, crushed, or otherwise deformed.

However, a problem associated with the edges of the cutouts in the female stripping board and blanking tool often occurs. Once the blank is die cut and held to the sheet of work material by the nicks, the blank(s) tend to sag away from the sheet of work material. Therefore, as the work material is advanced onto either the female stripping board or the female blanking tool, the edges of the blank, and the cut outs therein have a tendency to catch on the edges defined by the female stripping board and the female blanking tool, potentially damaging the blanks and disrupting the production thereof.

In an effort to address the problem of the blank edges catching on the tool, the edges defined by the tools have been chamfered or otherwise relieved. Historically, the process of chamfering the edges of the female stripping boards and the female blanking tools, has been accomplished using a hand held router. This often results in more material than is necessary being removed on more edges than are necessary to prevent the advancing work material from catching. Accordingly, when the stripping and blanking operations are performed, the relieved edges on the tools causes the edges in the blank to become crushed or otherwise deformed. This manual operation is time consuming and largely dependent on the operator's skill.

Based on the foregoing, it is the general object of the present invention to provide a method for preventing the advancing work material from catching on the stripping and blanking tools that overcomes the problems and drawbacks of prior art methods.

It is a more specific object of the present invention to provide a method for relieving the edges defined by the stripping and blanking tools that results in minimum material removal on the tools, and deformation of the blank.

SUMMARY OF THE INVENTION

The present invention is directed to a method for selectively relieving sharp edges in tools used in die cutting web, or sheet-type work material wherein a machining apparatus is provided and includes a rotary cutter movably mounted thereon. The tool is supported on the machining apparatus with the rotary cutter being moveable relative to the tool. The tools can each be of a different shape and include a variety of cut outs, each having a different shape. Accordingly, a controller is associated with the machining apparatus and has machine readable shape data corresponding to the configuration of at least one of the tools, stored therein.

The controller is programmed to determine, responsive to the shape data stored therein, the locations of edge segments defined by the tool against which the work material will impinge as it is advanced in a known direction onto the tool. The controller then generates a machining path which when followed by the cutter will relieve only those edge segments against which the work material will impinge as it is advanced.

In the preferred embodiment of the present invention, the cutter is a rotary implement, such as, but not limited to a router bit. The tool generally includes at least one, and more often several cut outs or apertures. The machining path generated by the controller is defined in part by a path approximately equivalent to the shape of the aperture, shifted by a predetermined distance. Preferably, the predetermined distance relative to the aperture is approximately one half of an effective cutting diameter defined by the rotary cutter in the direction at which the work material will be advanced onto the tool. This predetermined distance defines the edge of the relief to be machined into the female stripping board. The term "effective cutting diameter" should be broadly construed herein to mean the diameter of the rotary cutter at a point equivalent to the desired depth of the relief cut to be made.

In addition to the above-described apertures, the tools usually include at least one outer edge that will be encountered by the advancing work material. Often these outer edges are shaped such that portions thereof are parallel to the direction of work material advancement while others are perpendicular or oriented at some other angle relative to the direction of work material advancement.

This being the case, the shape data stored in the controller includes data corresponding to the shape of the outer edges of the tool that will be encountered by the advancing work material. Accordingly, the machining path generated by the controller is defined in part by a path approximately equivalent to the shape of the outer edges shifted by approximately one half of the effective cutting diameter of the rotary cutter in the direction at which the work material will be advanced onto the tool.

One advantage of the present invention is that the above described machining path results in relieving only those edges that have the potential to interfere with the advancement of the work material. For Example, edges parallel to the direction of advancement of the work material would not be machined. Nor would the edges of a shaped opening that are trailing relative to the direction of the advancing work material.

Another advantage of the present invention is that the above described method of relieving sharp edges results in minimal material removal. For example, where an edge is inclined relative to the direction of advancing work material, the edge would be proportionally smaller than it would be for an edge that is perpendicular to the advancing work material. In addition, where the edge to be relieved is arcuate, the relief will be crescent-shaped relative to the direction of advancement of the work material.

DETAILED DESCRIPTION OF THE PREFERRED EMBODIMENT

Figure 1:
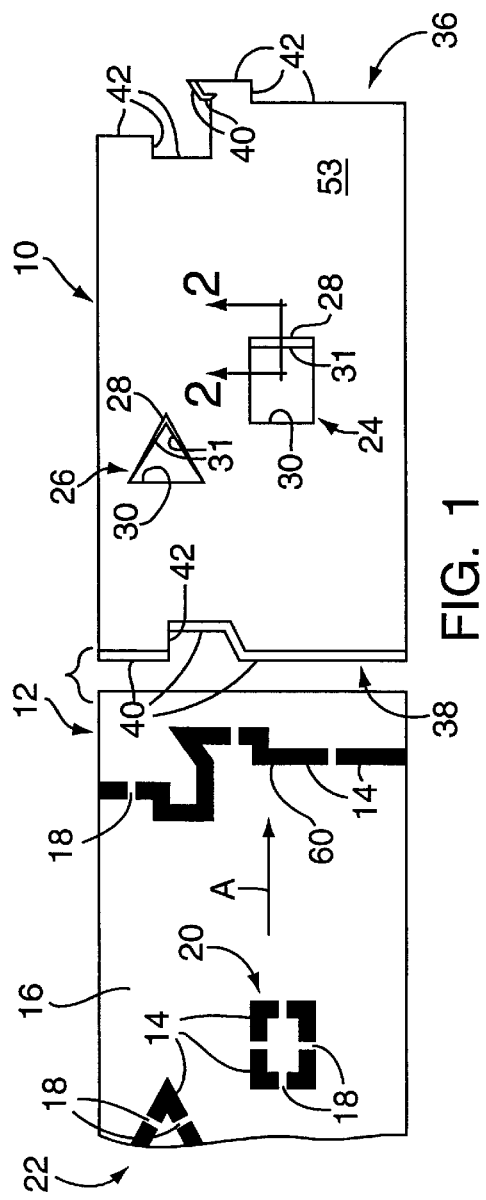
FIG. 1 is a plan view of a female stripping board showing a sheet of work material containing a die cut blank being advanced thereon.

A female stripping board useful in the manufacture of die cut blanks from web or sheet-type work material is shown in FIG. 1 and generally designated by the reference number 10. A web or sheet of work material generally designated by the number 12 and being advanced onto the female stripping board 10 by suitable means (not shown) in a first direction as indicated by the arrow labeled "A" is also shown in FIG. 1. The work material 12 has a die cut blank 16 for a package, box, or the like carried therein, as indicated by the lines of cut 14. The blank 16 is retained on the advancing sheet material 12 by a plurality of nicks 18 that bridge the lines of cut 14 between the blank 16 and the work material 12. In addition the blank 16 includes die cut shaped areal portions 20 and 22 that correspond to cut outs in the blank. The shaped areal portions 20 and 22 are square and triangular, respectively and like the blank 16 are retained on the work material by nicks 18. While only two shaped areal portions 20 and 22 are shown and described, the present invention is not limited in this regard as any number of areal portions corresponding to cut outs, assuming any number of shapes can be cut into the blank 16 without departing from the broader aspects of the present invention.

The female stripping board 10 is made from a suitable material, such as, but not limited to plywood, and in the illustrated embodiment includes mating square and triangular shaped apertures, 24 and 26 respectively. Each of the apertures 24 and 26 is adapted to align with a corresponding one of the shaped areal portions 20 and 22 cut into the sheet material. The apertures 24 and 26 each define a leading edge portion 28 and a trailing edge portion 30 relative to the direction of advancement of the work material 12, as indicated by the arrow labeled A. As used herein the term "leading edge portion" should be broadly construed to mean an edge, or section thereof, against which the work material could impact, or catch on, as it is advanced in the direction indicated by the arrow labeled A.

Figure 2:
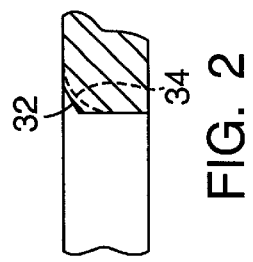
FIG. 2 is a partial cross sectional view taken along lines 2—2 of FIG. 1 and showing differently shaped reliefs that can be cut into edge sections defined by the female stripping board of FIG. 1.

Still referring to FIG. 1, and as will be explained in detail herein below, the leading edge portions 28 define edges 31 that are relieved to prevent the advancing work material 12 from catching thereon. The relieved edges 30 can include a chamfer 32 shown in FIG. 2, in solid lines, or the relieved edges can include a radius 34 shown in dotted lines in FIG. 2.

Referring back to FIG. 1, in addition to the apertures 24 and 26, the female stripping board 10 also includes leading and trailing outer edges 36 and 38 respectively. Depending on the shape of the leading and/or trailing outer edges, 36 and 38, sections 40 upon which the advancing work material 12 may impinge or catch, are relieved, while other sections 42 that will not interfere with the motion of the work material, are not relieved. While the female stripping board 10 is shown in the illustrated embodiment having two apertures, the present invention is not limited in this regard as the female stripping board can have any number of apertures of any shape without departing from the broader aspects of the present invention. In addition, while the outer edges 36 and 38 are shown as having a particular shape, the present invention is also not limited in this regard as the outer edges can assume any practical configuration without departing from the broader aspects of the present invention.

Figure 3:
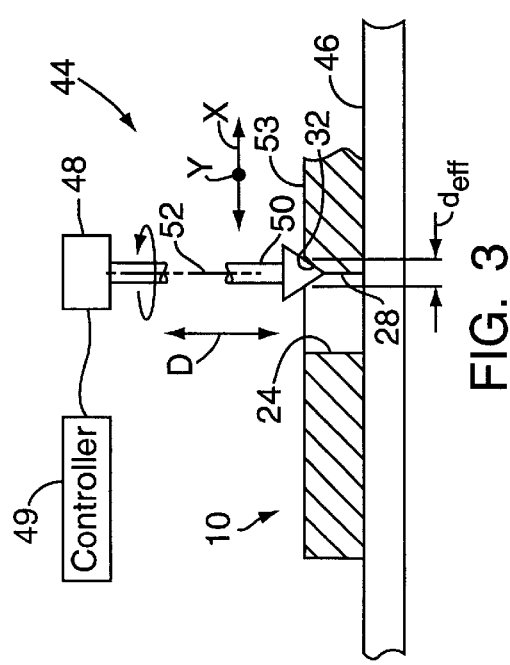
FIG. 3 is a partial schematic of a machining apparatus incorporating a rotary cutter, the rotary cutter is shown cutting a relief along an edge section defined by the female stripping board of FIG. 1.

As shown schematically in FIG. 3, a machining apparatus generally designated by the reference number 44 includes a support surface 46 having the female stripping board 10 carried thereon. The machining apparatus 44 includes a cutter head 48 mounted thereon for movement relative to the female stripping board 10 back and forth in a first coordinate direction as indicated by the arrow labeled X, and in a second coordinate direction labeled Y, approximately perpendicular to the first coordinate direction, in response to commands issued from a controller 49. As used herein, the term controller should be broadly construed to include programmable logic controllers, computers, and the like, having means for inputting, outputting, and retaining data.

Still referring to FIG. 3, a rotary cutter 50 shown in the illustrated embodiment as a router bit is mounted to the cutter head 48 for rotation about rotational axis 52. The router bit 50 is movable relative to the female stripping board 10 back and forth in response to commands issued from the controller 49, between a working and non-working position as indicated by the arrows labeled D. When in the non-working position, the router bit 50 is raised above the female stripping board 10. In the working position, as shown in FIG. 3, the router bit 50 engages the leading edge portions 28 of the aperture 24. However, the present invention is not limited in this regard, as the router bit can also selectively engage any of the leading edge portions 28, or the sections 40 of the outer edges 36 or 38, in response to commands issued from the controller 49.

When the router bit 50 is in the working position, the amount by which the leading edge portions 28 or the outer edge sections 40 are relieved is determined by the depth of engagement and, proximity to the edge to be relieved of the router bit relative to an upper surface 53 of the female stripping board 10. This engagement depth is indicated by the effective cutting diameter, labeled $d_{eff}$ in FIG. 3, of the router bit 50.

Figure 4:
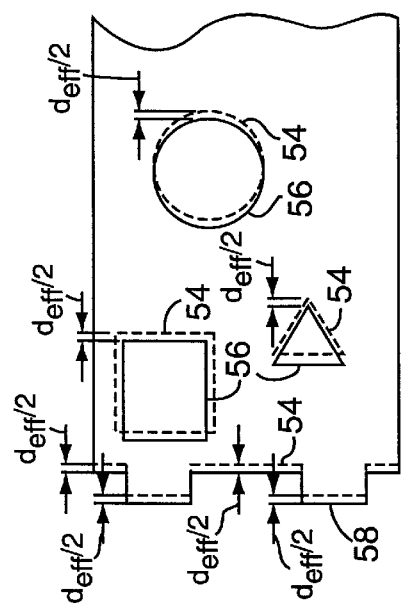
FIG. 4 is a partial plan view of a tool used in die cutting sheet-type work material, illustrating differently shaped cut out section and the reliefs machined into each cut out section.

Referring to FIGS. 3 and 4, the method for relieving the female stripping board will be explained in detail. Initially, data corresponding to the size and shape of the router bit 50, and the configuration of the stripping board 10 are stored in the controller 49. In addition, the size of the desired relief 31 is also input into the controller 49. Based on this data the controller generates a machining path for the router bit 50 to follow in order to relieve the appropriate edge sections on the female stripping board 10. As shown in FIG. 4, the paths labeled 54 (shown in dotted lines) are generated by the controller by first determining the shapes of the apertures 56, FIG. 4, and the outer edges 58, FIG. 4 (one outer edge shown) from the stored data corresponding to the stripping board.

Next, $d_{eff}$ is determined based upon the desired size of the reliefs to be machined into the appropriate edges of the stripping board. Based on the shapes of the apertures 56 and the outer edges 58, as well as $d_{eff}$, machining paths are created by the controller 49 by generating paths having a shapes approximately equivalent to the shapes of the apertures 56 and outer edge 58, and applying a cutter offset relative to the path 54 opposite the direction of advancement of the sheet material 12 as indicated by the arrow labeled A in FIG. 1. The controller then issues commands to the machining apparatus 44, causing the router bit 50 to selectively relieve the edge sections in the female stripping board that would otherwise interfere with the advancement of the work material thereon.

Referring back to FIG. 1, once the work material 12 is advanced onto the female stripping board 10, the shaped areal portions 20 and 22 will be positioned directly over the apertures 24 and 26. In addition, the edge 60 of the blank 16 will be positioned over the outer edge 36 of the female stripping board 10. A male stripping tool (not shown) then engages the female stripping board 10, causing the plurality of nicks 18 in the work material 12 to break, thereby removing the shaped areal portions 20 and 22, from the blank 16, and the blank 16, from the sheet material 12.

It is to be understood that the form of the invention shown and described herein is to be taken as a preferred embodiment of the same, and that various changes in the selection of parts comprising the broadly defined means and in the arrangement of said parts may be resorted to without departing from the spirit of the invention or the scope of the following claims.

What is claimed is:

1. A method for selectively relieving sharp edges in a tool used in die cutting web or sheet-type work material, comprising the steps of:

providing a tool for use in die cutting web or sheet-type work material having at least one aperture extending therethrough;

providing a machining apparatus for supporting said tool thereon, said machining apparatus including a rotary cutter mounted thereon and moveable relative to said tool;

providing a controller having machine readable shape data corresponding to at least one of said tools stored therein;

operating said controller to determine, responsive to said stored shape data, locations of edge segments defined by said tool against which said work material will impinge as said work material is advanced onto said tool in a first direction;

causing said controller to generate a machining path, including a path approximately equivalent to a shape defined by said at least one aperture, shifted in said first direction by a predetermined distance, which when followed by said cutter will relieve said edge segments; and operating said machining apparatus to cause said cutter to follow said machining path in response to command signals generated by said controller, thereby relieving said edge segments and preventing said work material from catching on said tool as it is advanced thereon.

2. A method for selectively relieving sharp edges in a tool used in die cutting web or sheet-type work material as defined by claim 1, wherein said tool is a female stripping board.

3. A method for selectively relieving sharp edges in a tool used in die cutting web or sheet-type work material, as defined by claim 1, wherein:

said cutter is a router bit; and said machining apparatus includes a support surface for carrying said tool, and a cutter head movable relative to said tool in response to commands issued from said controller, and having said router bit mounted for rotation thereon.

4. A method for selectively relieving sharp edges in a tool used in die cutting web or sheet-type work material as defined by claim 1, wherein said predetermined distance by which said machining path is shifted in said first direction is approximately one half of an effective cutting diameter defined by said rotary cutter.

5. A method for selectively relieving sharp edges in a tool used in die cutting web or sheet-type work material, comprising the steps of:

providing a machining apparatus for supporting a tool used in die cutting web or sheet-type work material thereon, said machining apparatus including a rotary cutter mounted thereon and moveable relative to said tool;

providing a controller having machine readable shape data corresponding to said tool stored therein;

operating said controller to determine, responsive to said stored shape data, locations of edge segments defined by said tool against which said work material will impinge as said work material is advanced onto said tool in a first direction, said edge segments including at least one outer edge section of said tool;

causing said controller to generate a machining path, which when followed by said cutter will relieve said edge segments, including generating a machining path approximately equivalent to a shape defined by said at least one outer edge section, shifted in said first direction by a predetermined distance; and operating said machining apparatus to cause said cutter to follow said machining path in response to command signals generated by said controller, thereby relieving said edge segments and preventing said work material from catching on said tool as it is advanced thereon.

6. A method for selectively relieving sharp edges in a tool used in die cutting web or sheet-type work material as defined by claim 5, wherein said predetermined distance by which said machining path is shifted in said first direction is approximately one half of an effective cutting diameter defined by said rotary cutter.

* * * * *